United States Patent Office 3,426,005
Patented Feb. 4, 1969

3,426,005
THERMOSETTING RESIN COMPOSITIONS AND A METHOD OF PRODUCING SAME
George E. Serniuk, Roselle, and Robert M. Thomas, Mountainside, N.J., assignors to Esso Research and Engineering Company, a corporation of Delaware
No Drawing. Continuation-in-part of application Ser. No. 443,641, Mar. 29, 1965. This application May 26, 1965, Ser. No. 459,088
U.S. Cl. 260—80.7    18 Claims
Int. Cl. C08f 1/72; C08f 19/10; C08f 19/16

ABSTRACT OF THE DISCLOSURE

An insoluble reticulated rigid polymer suitable for casting and laminating is prepared by reacting a polar vinyl monomer, a vinyl aromatic compound and an alicyclic or acyclic multiolefin, under anhydrous conditions, in the presence of a Friedel-Crafts halide and a free radical initiator.

---

The present application is a continuation-in-part of Ser. No. 443,641, now U.S. Patent 3,278,503, filed Mar. 29, 1965, in the names of George E. Serniuk and Robert M. Thomas. Ser. No. 443,641 is itself a continuation-in-part of Ser. No. 158,120, now abandoned, filed Dec. 8, 1961, which in turn is a continuation-in-part of Ser. No. 92,457, now U.S. Patent 3,183,217, filed Mar. 1, 1961, for the same applicants. The aforesaid applications are incorporated herein by reference in their entirety; however, as much of them as is necessary to understand the present invention will be repeated.

The present invention relates to a novel type of thermosetting resin and to a method of producing said resins. In particular, this invention relates to a resin prepared by copolymerizing, under anhydrous conditions, a polar vinyl monomer and a vinyl aromatic compound in the presence of a free radical initiator and a Friedel-Crafts halide. More particularly, this invention relates to resins formed from the terpolymerization of a polar vinyl monomer, a vinyl aromatic compound and an alicyclic or acyclic multiolefin. Still more particularly, this invention relates to resins prepared by polymerizing, under anhydrous conditions, a polar vinyl monomer-Friedel-Crafts halide complex with a vinyl aromatic compound and an alicyclic or acyclic multi-olefin in the presence of a free radical initiator and an excess of said polar vinyl monomer at a temperature of between about $-78°$ C. and about $175°$ C.

In the above-identified patent applications, new means for copolymerization have been taught. Specifically, in Ser. No. 92,457 it is disclosed that monomers which contain strongly negative groups and which respond to free radical but not Friedel-Crafts polymerization, e.g., acrylonitrile, can be complexed with a Friedel-Crafts halide and said complex copolymerized with a second monomer, which responds to Friedel-Crafts but not free radical polymerization, in the presence of a free radical initiator. Subsequently, it was discovered that the aforesaid type of polymerization reaction was not suited for continuous operations for the reason that no diluent was found which adequately solvated the reactants and the product. It was then found, as disclosed in Ser. No. 443,641 and Ser. No. 158,120, that the reactants and product could be solvated by utilizing an excess of polar vinyl monomer. As a result of this discovery, it was further found that aliphatic diolefins could be copolymerized with the metal halide complexed polar vinyl monomer utilizing the aforementioned polymerization procedures.

The polymeric product obtained by the procedures described in the above-identified applications is separated from the unreacted portion of the feed, the Friedel-Crafts halide and free radical initiator by conventional means.

Thereafter, the polymeric product is purified. In the alternative, the proportions of the reactants are adjusted so as to give a specific final composition and the polymerization is carried out to the extinction of the monomers.

It has now been discovered that the addition of a vinyl aromatic compound to the hereinabove mentioned polymerization system results in the preparation of hard, clear thermoset compositions which are machineable and which are capable of conducting electric current. Thus, post polymerization purification and/or separation of the polymeric product is avoided.

The exact nature and objects of the instant invention will be more clearly perceived and more fully understood by referring to the following description and claims.

The polar vinyl monomer utilized in the present process can be characterized as containing strongly negative groups which do not promote electron pair release at the double bond, e.g., vinyl halides, vinylidene halides, vinyl esters, acrylic esters, and methacrylic esters. See Textbook of Polymer Chemistry by F. W. Billmeyer, Jr., Interscience Publishers, 1957, pp. 263–264. More specifically, the polar vinyl monomers of the present novel method can be depicted by the following structural Formula I:

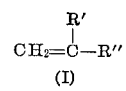

(I)

wherein R' is selected from the group consisting of hydrogen, $C_1$–$C_4$ alkyl, cyano and halogen, and R" is selected from the group consisting of halogen, cyano, formyl, carboxy, formamido, $C_1$–$C_8$ alkoxy, formoxy, acetyl, carboxamido, —COOR, —OCOR, —SO$_2$R, wherein R is a $C_1$–$C_8$ alkyl.

Suitable examples of polar vinyl monomers corresponding to the above recited structural Formula I include: vinyl halides such as vinyl chloride, vinyl bromide, vinyl fluoride, and vinyl iodide, vinylidene halides, such as vinylidene chloride, and vinylidene bromide; vinylidene cyanide; vinyl alcohol esters of $C_2$–$C_8$ monocorboxylic acids, such as vinyl acetate, vinyl propionate, vinyl butyrate, vinyl caproate, and vinyl caprylate; acrylonitrile, methacrylonitrile, acrolein, acrylamide, methacrylamide, vinyl ethers, acrylic acid, methacrylic acid; esters of acrylic and methacrylic acid, such as the esters of $C_1$–$C_8$ alcohols, preferably the esters of $C_1$–$C_4$ alcohols, and vinyl sulfones such as vinyl butyl sulfone. Especially effective and preferred are acrylonitrile, methacrylonitrile, acrolein, acrylic acid, methacrylic acid, methyl methacrylate, vinyl acetate, and vinylidine cyanide.

The Friedel-Crafts halides employed in the present novel method are those which form a complex with the hereinabove-mentioned polar vinyl monomers as, for example, through a coordinate bond. Typical metal halides thus include: zinc chloride, aluminum chloride, ferric chloride, cadmium chloride, mercuric chloride, and boron trifluoride. Zinc chloride is preferred. Other metals, the halides of which can also be utilized, include: copper, indium, titanium, zirconium, tin, vanadium, chromium, molybdenum, tungsten, manganese, cobalt, nickel, palladium, platinum and osmium. The bromides, iodides, fluorides and chlorides of the aforementioned metals can be employed as the Friedel-Crafts halide in the instantly disclosed polymerization process. The chlorides and bromides are preferred.

In preparing the Friedel-Crafts halide-polar vinyl monomer complex, the halide may first be complexed with the polar vinyl monomer and then the other monomeric reactants containing the free radical initiator admixed therewith, or, vice versa. If desired, the metal halide may be added directly to the admixture of monomeric reactants and free radical initiator. In the latter case, the complex is formed in situ. The Friedel-Crafts halide is conveniently utilized in an equimolar ratio with the polar vinyl monomer; however, the mole ratio of polar vinyl monomer to metal halide can vary between about 1:1 and about 100:1, preferably between about 2:1 and about 50:1.

The vinyl aromatic compounds utilized to prepare the novel resin compositions of the instant process include styrene, homologs and derivatives thereof. Styrene, which is well known in the art, can be prepared by any one of numerous methods such as by alkylation of benzene with ethylene and subsequent dehydrogenation of purified ethylbenzene in the presence of steam. Homologs of styrene include those compounds prepared by modifying styrene to incorporate alkyl groups and/or halogen groups. More specifically, the vinyl aromatic compounds of the present process can be depicted structurally by the following formula:

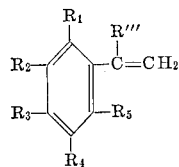

wherein $R'''$ is selected from the group consisting of hydrogen and halogen, such as chlorine and bromine, and wherein $R_1$, $R_2$, $R_3$, $R_4$ and $R_5$ may be the same or different and are, therefore, each selected from the group consisting of hydrogen, halogens, such as chlorine, bromine, fluorine and iodine, methoxy, N,N-dimethylamino, cyano, acetoxy, hydroxy, nitro, trifluoromethyl, N,N-dimethylsulfonamido, and $C_1$–$C_{18}$, preferably $C_1$–$C_8$, alkyl.

Suitable examples of vinyl aromatic compounds include: ortho-methylstyrene; meta-methylstyrene; para-methylstyrene; ortho-ethylstyrene; para-ethylstyrene; 2,4-dimethylstyrene; 2,3-dimethylstyrene; 2,5-dimethylstyrene; para-tertiary butylstyrene; ortho-chlorostyrene; meta-chlorostyrene; 2,4,6-tri-chlorostyrene; mono- di-, and tri-fluorostyrenes; 1,4-diethylstyrene; 1-methyl-4-chlorostyrene; meta-bromostyrene; ortho-bromostyrene; para-bromostyrene, 2,4-dichlorostyrene; 2,5-dichlorostyrene; 2,6-dichlorostyrene; para-octylstyrene; meta-dodecylstyrene; p-methoxystyrene, p-N,N-dimethylaminostyrene, p-cyanostyrene, p-acetoxystyrene, p-hydroxystyrene, alphachlorostyrene, m-nitrostyrene, m-trifluoromethylstyrene, p-N,N-dimethylsulfonamidostyrene and/or mixtures thereof.

The mole ratio of polar vinyl monomer to vinyl aromatic compound will generally be between tbout 0.05:1 and about 50:1, preferably between about 1:1 and about 10:1.

The alicyclic and acylic multiolefins utilized to prepare the resin compositions of the present process are, generally, $C_4$–$C_{12}$ diolefins. The diolefins can be conjugated or nonconjugated; however, conjugated diolefins are preferred. Suitable examples of $C_4$–$C_{12}$ diolefins include: butadiene, isoprene, piperylene, 2,5-dimethyl-2,5-hexadiene, 2,3-dichloro-1,3-butadiene, 2-iodo-1,3-butadiene; 2-bromo-1,3-butadiene; 2-chloro-1,3-butadiene; 2-chloro-3-methyl-1,3-butadiene; 1,2,3-trichloro-1,3-butadiene; 2 - phenyl-1,3-butadiene; 1 - methyl-2-chloro-1,3-butadiene; 1-octyl-2-chloro-1,3-butadiene; cyclopentadiene; methylcyclopentadiene and others such as, for example, alloocimene. Preferred aliphatic diolefins include: isoprene, butadiene, piperylene, chloroprene, cyclopentadiene, methylcyclopentadiene and 2,5-dimethyl-2,5-hexadiene and 2,5-dimethyl-1,5-hexadiene. The mole ratio of polar vinyl monomer to aliphatic diolefin can vary between about 0.002:1 and about 50:1, but, preferably varies between about 0.2:1 and about 30:1.

The free radical initiator employed in the present process can be chosen from any of a wide variety known in the art, e.g., organic peroxides and hydroperoxides. Suitable examples of free radical initiators include: ketone peroxides, such as methyl ethyl ketone peroxide, methyl isobutyl ketone peroxide and cyclohexanone peroxide; hydroperoxides, such as cumene hydroperoxide, 1-methyl-1-hydroperoxycyclopentane, tetrahydrofuran hydroperoxide, tetralin hydroperoxide, 2-methyl tetrahydrofuran hydroperoxide, tertiary butyl isopropyl benzene hydroperoxide; diacyl peroxides, such as benzoyl peroxide, bis (4-chlorobenzoyl) peroxide, bis (4-methoxy benzoyl) peroxide, phthalyl peroxide, lauroyl peroxide, acetyl lauroyl peroxide, adipoyl peroxide; dialkyl peroxides, such as di-tert-butyl peroxide; di-tert-cumyl peroxide, dicumyl peroxide; peresters, such as tertiary butyl peracetate, tertiary butyl perbenzoate, di-tert-butyl permalonate; peroxidized butyl ether; azobisdiisobutyronitrile; and gamma radiation. Methyl alkyl free radical generators such as boron alkyls and aluminum alkyls, e.g. aluminum triethyl, can also be employed. The chemical free radical initiators are utilized in an amount of between about 0.001 and about 5.0 wt. percent based on the polar vinyl monomer. In the case of gamma radiation, it is preferred to have a neutron flux in the reaction zone above at least $5 \times 10^{11}$ neutrons per centimeter squared per second (n./cm.$^2$/sec.) to achieve an efficient polymerization rate. Expressed as gamma radiation the dose rate is in the range of about $10^5$ to $5 \times 10^7$ megaroentgens/hr. The dose received by the polymer is in the range of about $10^{-3}$ to 10 kwh. per pound, preferably 1 to 3 kwh./lb.

Polymerization temperatures are generally in the range of between about −78° C. and about 175° C., preferably between about −40° C. and about 100° C. Polymerization pressures can range between about 1 and about 1000 atmospheres, with 1 to 200 atmospheres being preferred. Reaction times can vary between several minutes and several days depending primarily on the amount of metal halide present; but, also on the nature of the monomers used, the reaction temperatures and the type and amount of initiator employed. In general, the rate and temperature of the reaction increase with the amount of metal halide employed.

In carrying out the polymerization reaction of the present process, the monomeric polymerization mixture comprising (1) a polar vinyl monomer, (2) a Friedel-Crafts halide, (3) a vinyl aromatic compound, (4) an alicyclic or acyclic multiolefin and (5) a free radical initiator is charged to a reaction container, which can be preshaped mold, reinforcing element, such as cloth or glass fibers or any other suitable container, and polymerized by heating under pressure or allowing the mixture to stand at room temperature for a sufficient period of time. The polymers formed are clear, hard, solid materials which take the form of the reaction container. Since the polymer products contain Friedel-Crafts halide, the polymers conduct an electric current. The polymers, also, are capable of piping light through changes in direction.

It is apparent from the discussion hereinabove that the thermosetting resin compositions of the present process can be utilized to prepare finished, preshaped articles, reinforced laminates and other reinforced plastics. The resin compositions of the present process have excellent Izod impact strength.

The reinforcing elements that can be used to prepare reinforced structures include: fibers formed from mineral materials, e.g., glass, carbon, coke, asbestos, mica, rock and celite; vegetable fibers, e.g., cotton, wood, linen, rayon and silk; organic materials, e.g., hair, nylon and Orlon; and metallic filaments or wire, e.g., iron, aluminum and copper. Reinforcing elements can comprise up to about 95%, e.g., 25 to 95%, by weight of the reinforced plastic, preferably between about 35% and about 80%. The preferred reinforcing material is glass fiber.

The inventive process is more particularly described in the following examples which are intended as illustrative only since numerous modifications and variations therein will be apparent to those skilled in the art.

EXAMPLE 1

A static polymerization was conducted in a suitable reactor with the following charge:

| Reactants— | Amount |
|---|---|
| Fused zinc chloride (0.1 mole) _____grams__ | 13.6 |
| Acrylonitrile (1 mole) _____ml__ | 66 |
| Styrene (0.385 mole) _____grams__ | 41.6 |
| Isoprene (0.1 mole) _____do____ | 6.8 |
| Benzoyl peroxide (0.00008 mole) _____gram__ | 0.01 |

The polymerization mixture was allowed to stand at room temperature, i.e., 24° C., for 6 days after which time a hard polymer formed in the lower section of the reactor and a small layer of soft polymer formed near the top of the reactor. The soft polymer section was cut away from the hard polymer. The hard polymer, which was clear and amber colored, conducted an electric current.

Electrical measurements were made using a General Radio Company dielectric sample holder, Type 1690A consisting of parallel plates with micrometer control coupled to a capacitance A.C. bridge, No. 716-C. Resistivity measurements were made with a D.C. power source, Keithly 610A Electrometer. The amount of current recorded for the corresponding potential drop applied to the polymer of this example is found in Table I.

Table I

| Volts, D.C.: | Amperes × $10^{-10}$ |
|---|---|
| 100 | 1.6 |
| 200 | 4.5 |
| 300 | 9 |
| 400 | 15.5 |

EXAMPLE 2

A monomeric polymerization mixture was prepared from the following charge:

| Reactants— | Amount, grams |
|---|---|
| Fused zinc chloride (0.3 mole) _____ | 40.8 |
| Acrylonitrile (3 mole) _____ | 159 |
| Styrene (1.2 mole) _____ | 124.8 |
| 2,5-dimethyl-2,5-hexadiene (.102 mole) ____ | 11.2 |
| Benzoyl peroxide (0.00008 mole) _____ | 0.01 |

A metal mold 6½ inches x 9½ inches x ⅛ inch was layered with a Mylar film and 12 pieces of glass cloth each piece being soaked with a monomer solution described above. The cloth was covered with a Mylar film and the excess of monomer solution pressed out by hand. The mold was placed into a press for 30 minutes at 200° F. and 1000 p.s.i.g. The resulting laminate was light in color and substantially "set-up." After standing at room temperature for 1 day, the laminate became hard and remained light in color.

EXAMPLE 3

A monomer polymerization mixture having the same composition as the mixture prepared in Example 1 was poured into a glass tube and ⅔ its weight of powdered mica was added to the tube. After standing for 3 days at room temperature, i.e., 24° C., a solid, mica-filled resin was formed which retained the shape of the tube in which it was cast.

EXAMPLE 4

A polymerization charge similar to that of Example 1 was prepared, charged to a suitable reactor and permitted to stand at room temperature, i.e., 24° C., for 2 days. Thereafter, the product was heated at 60° C. for 2 days. The resulting polymeric product was a hard, amber colored, transparent resin. The resin was machined to provide test specimens of ⅛ inch x 2½ inches x ½ inch dimensions. These specimens were notched and the Izod impact strength thereof was determined. The average impact strength value for these specimens was 0.73 ft. pounds per inch of notch.

EXAMPLE 5

A polymerization charge was prepared utilizing the following ingredients: 0.4 mole of fused zinc chloride, 1 mole of acrylonitrile, 0.385 mole of styrene and 0.1 mole of isoprene. The polymerization charge was placed in a suitable reactor and polymerized rapidly without the addition of a free-radical generator to form a polymeric product which was fire-resistant.

EXAMPLE 6

In a similar manner to Example 5, a polymerization charge was prepared with the same ingredients except that 0.3 mole of fused zinc chloride was utilized instead of 0.4 mole. Polymerization was initiated with a small amount of benzoyl peroxide to form a product which sputtered when held in a flame; but which did not burn when the flame was removed.

When a similar polymerization charge utilizing only 0.2 mole of fused zinc chloride was prepared and polymerized with added benzoyl peroxide, the polymeric product formed was not fire retardant.

Thus, Examples 5 and 6 illustrate that the polymerization raate of the monomeric mixtures of the instant process is increased by increasing the amount of zinc chloride utilized and that the fire retardancy of the polymeric product is also improved by increasing the ratio of Friedel-Crafts halide to polar vinyl monomer in the polymerization charge.

While there are above described a number of specific embodiments of the present invention, it is obviously possible to produce other embodiments of various equivalent modifications and variations thereof without departing from the spirit of the invention.

Having now set forth the general nature and specific embodiments of the present invention, the true scope is now particularly pointed out in the appended claims.

What is claimed is:

1. A process which comprises
   (A) admixing
      (1) a polar vinyl monomer represented by the structural formula,

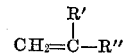

wherein R' is selected from the group consisting of hydrogen, $C_1$–$C_4$ alkyl, cyano and halogen; and R" is selected from the group consisting of halogen, cyano, formyl, carboxy, formamido, $C_1$–$C_8$ alkoxy, formoxy, acetyl, carboxamido, —COOR, —OCOR, —$SO_2$R, wherein R is a $C_1$–$C_8$ alkyl;

(2) a vinyl aromatic compound having the general structural formula

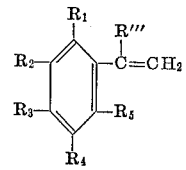

wherein R''' is selected from the group consisting of hydrogen and halogen and $R_1$, $R_2$, $R_3$, $R_4$ and $R_5$ are independently selected from the group consisting of hydrogen, halogen, methoxy, N,N-dimethylamino, cyano, acetoxy, hydroxy, nitro, trifluoromethyl, N,N-dimethyl-sulfonamido, and $C_1$–$C_{18}$ alkyl; the mole ratio of said polar vinyl monomer to the vinyl aromatic compound being between about 0.05:1 and about 50:1;

(3) a $C_4$-$C_{12}$ multiolefin, the mole ratio of said polar vinyl monomer to the multiolefin being between about 0.02:1 and about 50:1; and (4) a Friedel-Crafts halide, the mole ratio of said polar vinyl monomer to the Friedel-Crafts halide being between about 1:1 and about 100:1; and (B) polymerizing said admixture, under anhydrous conditions, at a temperature of between about −78° C. and about 175° C. in the presence of a free radical initiator.

2. The process of claim 1 wherein the polar vinyl monomer is acrylonitrile.

3. The process of claim 1 wherein the multiolefin is selected from the group consisting of $C_4$-$C_{12}$ alicyclic and acyclic diolefins.

4. The process of claim 1 wherein the Friedel-Crafts halide is zinc chloride.

5. The process of claim 1 wherein the free radical initiator is benzoyl peroxide.

6. The process of claim 1 wherein the polar vinyl monomer and Friedel-Crafts halide are premixed to form an equimolar complex before being added to the reaction mixture.

7. The process of claim 3 wherein the multiolefin is isoprene.

8. A process which comprises (A) admixing (1) acrylonitrile; (2) styrene; (3) isoprene; and (4) zinc chloride, the mole ratio of (1):(2):(3):(4) being about 1:0.385:0.1:0.1, and (B) polymerizing said admixture, under anhydrous conditions, at a temperature of between about −40° C. and about 100° C. in the presence of a minor amount of benzoyl peroxide.

9. A process which comprises (A) admixing (1) acrylonitrile; (2) styrene; (3) 2,5-dimethyl-2,5-hexadiene; and (4) zinc chloride, the mole ratio of (1):(2):(3):(4) being about 3:1.2:0.1:0.3, and (B) polymerizing said admixture, under anhydrous conditions, at a temperature of between about −40° C. and about 100° C. in the presence of a minor amount of benzoyl peroxide.

10. A thermoset resin comprising:
(1) a polar vinyl monomer represented by the structural formula,

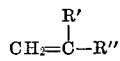

wherein R′, is selected from the group consisting of hydrogen, $C_1$-$C_4$ alkyl, cyano and halogen; and R″ is selected from the group consisting of halogen, cyano, formyl, carboxy, formamido, $C_1$-$C_8$ alkoxy, formoxy, acetyl, carboxamido, —COOR, —OCOR, —$SO_2R$, wherein R is a $C_1$-$C_8$ alkyl;

(2) a vinyl aromatic compound having the general structural formula

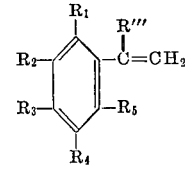

wherein R‴ is selected from the group consisting of hydrogen and halogen and $R_1$, $R_2$, $R_3$, $R_4$ and $R_5$ are independently selected from the group consisting of hydrogen, halogen, methoxy, N,N-dimethylamino, cyano, acetoxy, hydroxy, nitro, trifluoromethyl, N,N-dimethyl-sulfonamido, and $C_1$-$C_{18}$ alkyl; the mole ratio of said polar vinyl monomer to the vinyl aromatic compound being between about 0.05:1 and about 50:1;

(3) a $C_4$-$C_{12}$ multiolefin, the mole ratio of said polar vinyl monomer to the multiolefin being between about 0.02:1 and about 50:1; and (4) a Friedel-Crafts halide, the mole ratio of said polar vinyl monomer to the Friedel-Crafts halide being between about 1:1 and about 100:1.

11. The thermoset resin of claim 10 wherein the polar vinyl monomer is acrylonitrile.

12. The thermoset resin of claim 10 wherein the multiolefin is selected from the group consisting of $C_4$-$C_{12}$ alicyclic and acyclic diolefins.

13. The thermoset resin of claim 10 wherein the Friedel-Crafts halide is zinc chloride.

14. The thermoset resin of claim 12 wherein the multiolefin is isoprene.

15. The thermoset resin produced according to the process of claim 8.

16. The thermoset resin produced according to the process of claim 9.

17. The process of claim 1 wherein the vinyl aromatic compound is styrene.

18. The product of claim 10 wherein the vinyl aromatic compound is styrene.

References Cited

UNITED STATES PATENTS 3,278,503   10/1966   Serniuk et al. _____ 260—825

JOSEPH L. SCHOFER, *Primary Examiner.*

STAMFORD M. LEVIN, *Assistant Examiner.*

U.S. Cl. X.R.

204—159.22; 260—79.3, 80.6, 80.78